United States Patent Office 3,606,526
Patented Sept. 20, 1971

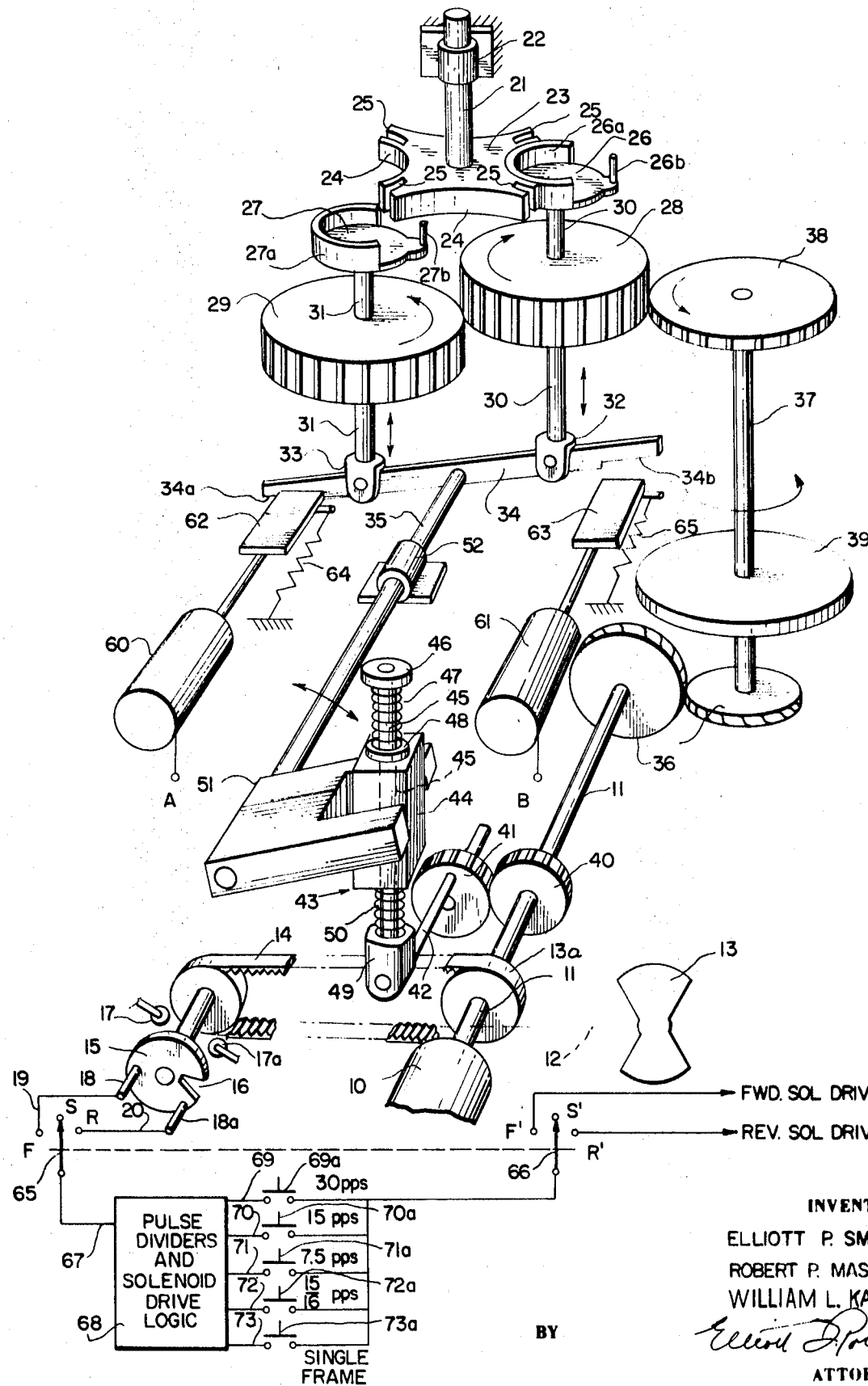

3,606,526
INDEXING DRIVE MECHANISM
Elliott P. Smith, Huntington, Robert P. Mason, Setauket, and William L. Kacin, Northport, N.Y., assignors to LogEtronics Inc., Springfield, Va.
Filed Mar. 13, 1970, Ser. No. 19,232
Int. Cl. G03b 1/38
U.S. Cl. 352—166                        10 Claims

ABSTRACT OF THE DISCLOSURE

An indexing drive mechanism is provided to transport film in a flickerless projection viewer. The indexing mechanism includes a Geneva star and a pair of Geneva drivers positioned adjacent opposed camming surfaces of the star. The two Geneva drivers are mechanically interlocked and synchronously driven for both rotational and axial reciprocating motion relative to the Geneva star, the arrangement being such the drivers normally operate to lock the Geneva star in fixed position. The reciprocating motion of the drivers is selectively interrupted to cause a selected one of the drivers to effect 90° rotation of the star in a selected one of two opposite directions.

BACKGROUND OF THE INVENTION

In various applications, it is desirable to achieve an indexing operation in an extremely short time interval, with precision, and at a selectable preferably variable indexing rate and direction. For example, in the medical field, there is need for mechanism capable of viewing a strip of motion picture film, e.g., of the cinefluorographic type, and, during such viewing, capable of stepping rapidly from frame to frame in both a forward and reverse direction, achieving apparent continuous subject motion when desired, and capable of stopping on a single frame for a protracted period of time when desired. The capability of rapidly stepping back and forth between two adjacent frames is highly useful, for example, in the comparison of images on adjacent frames as part of a diagnostic technique. In other fields, moreover, requirements exist for a precise indexing device having a constant index time, a selectable indexing rate, and the ability to instantly stop an indexing operation or to reverse its direction.

A wide variety of mechanical movements have been suggested heretofore for achieving indexing operations; but such prior movements have, for one reason or another, been incapable of achieving all of the operating characteristics described above. In many cases, for example, the indexing operation requires that relatively massive elements be accelerated, decelerated, or have their direction of motion reversed, during the indexing operation. In some cases these motion changes are achieved mechanically, and in other cases they are achieved electro-mechanically, e.g., through the use of electrically responsive clutches; but in all such cases the inertia of the mechanical elements constituting the index system makes it impossible to achieve a constant, relatively short index time, or a readily selectable indexing rate, or ready reversal of the indexing direction.

In an effort to eliminate some of these inertia problems, e.g., in an attempt to provide an indexing mechanism for use in flickerless film projectors or viewers, alternative approaches have been suggested. One such alternative approach contemplates the use of a reciprocating claw adapted to selectively engage sprocket holes in a film strip; but this type of system limits use of the device to sprocket type film materials, a restriction which may be undesirable in many circumstances. Other approaches, in an effort to achieve flickerless projection or viewing, contemplate controlling optical elements, e.g., rotating or reciprocating mirrors, prisms, etc. Again, however, these types of systems involve inertia problems and, particularly at slow frame rates, result in observable disturbing optical effects.

To the extent that electro-mechanical indexing systems have been suggested heretofore, moreover, another problem has manifested itself. In some prior art systems, the mechanical movement has been effected, synchronized, and/or otherwise controlled by electrically responsive components; and the arrangement has sometimes been such that an electrical failure results in complete loss of synchronization with possible resultant mechanical damage to the movement.

The present invention is intended to obviate all of these disadvantages of known indexing mechanisms.

SUMMARY OF THE INVENTION

The present invention is concerned with an indexing or intermittent drive mechanism adapted for use in various systems where precise indexing in a constant index time, and at a selectable index rate and direction, are needed. When used to effect film transport in a photographic viewer or projector, the system is adapted to precisely index a frame of film in, for example, approximately 8 milliseconds, permitting (by use of a two-bladed projector shutter) a flicker rate as high as 60 cycles per second to be maintained. Indexing can be commanded to occur at frame rates variable from a single frame at will, up to 30 frames per second repetitively; and, whatever the rate selected, no flicker is apparent since the actual film indexing from frame to frame always occurs within the 8 millisecond projector shutter closed time. The drive can be indexed in both forward and reverse directions, and the indexing direction can be changed substantially instantaneously without apparent screen flicker. Moreover, the drive can be started, stopped, and driven in a forward or reverse direction at various selected rates without change in screen brightness since the projector shutter is always driven at a constant rate.

The 8-millisecond indexing time mentioned above actually relates to a projector application where the maximum frame rate desired in 30 frames per second. The indexing mechanism of the present invention can, however, be used for purposes other than a film drive, and is applicable to any system where requirements exist for a precise indexing device that has a constant index time and a selectable indexing rate, with the ability to instantly stop the indexing operation, or to reverse its direction. In such other applications, the indexing speed can be either faster or slower than the 8 millisecond index time mentioned, as may be desired.

The mechanism itself constitutes a Geneva star connected to an output shaft which is to be rotated in 90° increments during the indexing operation. The star is associated with a pair of Geneva drivers each of which has a cam and a drive pin spaced therefrom; and the two drivers are disposed respectively adjacent opposing camming surfaces of the Geneva star. The drivers are geared to one another for rotation in opposing directions; and the drivers are, moreover, mechanically interlocked to one another for reciprocation in opposing axial directions by means of an oscillating rocker arm. The aforementioned rocker arm and gears are driven by a common drive motor so that the rotational and reciprocating motion of the two drivers are mechanically synchronized with one another.

The two drivers rotate about axes parallel to the axis of rotation of the drivers. As the two drivers rotate and reciprocate, the driver cams alternately engage the opposing camming surfaces of the Geneva star to assure that the Geneva star is always positively locked against rotation under normal operating conditions. When the cam of one driver is in engagement with its associated Geneva star camming surface, the pin of the other driver is, at that time, axially spaced from the slots in the Geneva driver; and as said one driver rotates toward a position where its pin could achieve drive, the driver reciprocation moves that one driver axially to a position where no drive can be achieved while the other driver is simultaneously moved axially to a position where its cam achieves the desired locking function. The reciprocation motion of the two drivers thus causes the two drivers to alternately assume the Geneva star locking function described, and also assures that the drive pins on the two drivers are alternately moved to an axial position where no drive can be achieved.

In order to produce a desired indexing operation, the reciprocation of the drivers is selectively interrupted by means of solenoid controls adapted to arrest the oscillating motion of the aforementioned rocker arm. The drive train between the main drive motor and the rocker arm includes resilient elements so that reciprocating motion of the drivers can be interrupted without arresting operation of the main drive. Interruption of the driver reciprocating motion causes the driver which then has its cam in engagement with an associated camming surface of the Geneva star to continue its rotation in the same plane so that its drive pin engages a Geneva star slot to rotate the Geneva star and associated output shaft through 90°. Inasmuch as the two drivers rotate in opposite directions, the actual direction of indexing (i.e., in a forward or reverse direction) can be controlled by holding the rocker arm at the peak of its travel in one direction or the other to select a particular one of the two drivers for the driving operation.

Electrical pulse generating means forming a portion of the indexing system produces a train of electrical pulses which correspond in timing and repetition rate to the mechanical positions and reciprocating motion of the Geneva drivers. The train of pulses, or selected pulses in the train, are employed to operate the aforementioned solenoid controls to achieve interruption of the Geneva driver reciprocating motion at desired times and/or for desired time intervals. Each pulse in the train has a pulse length which is approximately equal to the period for one cycle of the Geneva driver; and coupling of a single pulse to the solenoid controls will accordingly result in a single indexing of the Geneva star. In the arrangement to be described, up to 30 pulses per second can be coupled to the solenoid controls to cause automatic indexing of the mechanism at a rate of 30 frames per second corresponding to continuous subject motion. By appropriately controlling the pulse selection, however, automatic indexing at frame rates of 15, 7½, or substantially 1 frame per second can be achieved. Moreover, single frame advance either in a forward or reverse direction can be accomplished at will.

When the mechanism is employed in a film viewer projector, each control pulse operates to index a frame of film in approximately 8 milliseconds, corresponding to the time interval during which the main projector shutter is closed. The film is indexed from frame to frame without any apparent flicker since the flicker rate is well above what can normally be perceived by the human eye.

Since the driving portions of the system are in constant unidirectional rotation, inertial effects are minimized. The only inertial effects present involve movement of the Geneva star, the output shaft, and any associated load; and the inertia of these elements can be handled easily within the indexing time specified. Moreover, due to the fact that the movement is mechanically synchronized, and operates under normal conditions to merely lock the Geneva drive in place without effecting drive thereto, the system operates in a fail-safe manner. Any failure in the electrical portion of the device cannot result in mechanical damage to the movement since such electrical failure merely renders it impossible to arrest the reciprocating motion of the Geneva drivers, whereby the drivers merely continue their Geneva star locking functions without driving the star.

BRIEF DESCRIPTION OF THE DRAWING

The drawing diagrammatically illustrates an indexing drive mechanism constructed in accordance with the present invention.

DESCRIPTION OF THE PREFERRED EMBODIMENT

As discussed earlier, the present invention is concerned with an improved indexing drive mechanism having various advantages and characteristics which have already been described, and adapted for use in various environments including use in a flickerless type of projection viewer. In a "flickerless" projector, each film frame is transported during the time interval that the projector shutter interrupts the projected image; and by keeping the shutter rate high enough to be imperceptible to the observer, the image will change without apparent flicker. Since the mechanism of the present invention is capable of precisely indexing a frame of film in approximately 8 milliseconds, corresponding to the time during which the projector shutter is closed, a flicker rate as high as 60 cycles per second can be maintained by use of a two-bladed projector shutter. Moreover, as will be apparent, precise indexing can be commanded to occur at various frame rates, and in forward or reverse directions; and the actual direction of indexing can be changed substantially instantaneously without apparent screen flicker.

The drawing illustrates a drive mechanism constructed in accordance with the present invention, and shows in diagrammatic form how it may be incorporated in a projector viewer of the type contemplated by the present invention. The details of the projector viewer are not shown, however. In general, the viewer can comprise a relatively compact, lightweight and portable desktop unit adapted to accept 100 foot and 200 foot film loads wound on standard metal-flanged daylight-loading spools or on film cores; and images may be projected onto a screen forming a portion of the unit, or onto a remote screen or wall when larger picture sizes are desired. To this effect, the unit is associated with an appropriate projection lamp, an appropriate optical system, etc., none of which have been specifically shown in the drawing.

The indexing mechanism employed in the aforementioned projector viewer comprises a main drive motor 10 whose output drives a shaft 11 at approximately 1800 r.p.m. As will be appreciated, this particular motor and shaft speed is appropriate for use in a projector viewer where frame rates as high as 30 frames per second may be desired; but when the indexing mechanism of the present invention is employed in other environments, other motor speeds can be used. Shaft 11 is coupled, as diagrammatically illustrated at 12, to a two-bladed projection lamp shutter 13 whereby the rotation of shutter 13 is synchronized with the operation of the remaining portion of the system.

A timing belt pulley 13a is connected to drive shaft 11, and cooperates with a timing belt 14 to drive a photocell shutter 15 at a rotational rate identical to the speed of rotation of drive shaft 11. Photo-cell shutter 15 is provided with a peripheral slot 16; and a pair of spaced lamps 17, 17a are disposed on one side of shutter 15, with a pair of spaced photodiodes 18, 18a, being disposed on the opposite side of shutter 15. As shutter 15 rotates, light from lamp 17 is projected 30 times per second onto photodiode 18 and, at different instants of time, light from lamp 17a is projected 30 times per second onto photodiode 18a. By reason of this operation, a first train of pulses, having a repetition rate of 30 pulses per second appears on line 19; and a second train of pulses having a repetition rate of 30 pulses per second appears during intervening time intervals on line 20. The pulse trains appearing on lines 19 and 20, and selected pulses in each of the pulse trains, are used for control purposes as will be described in greater detail subsequently.

The indexing mechanism of the present invention includes an output shaft 21 mounted in a bearing 22 and connected to an appropriate toothed drive sprocket, or gear drive, or friction drive, etc., (not shown) adapted to transport a strip of film, frame by frame, past shutter 13. Movement of output shaft 21 is governed by a Geneva star 23 of conventional configuration comprising a plurality of arcuate camming surfaces 24 having drive slots 25 disposed therebetween. A pair of Geneva drivers 26 and 27 are positioned in spaced relation to one another adjacent opposing ones of the star camming surfaces 24.

Geneva driver 26 includes an arcuate cam 26a extending through an arc of substantially 270°, and further includes a drive pin 26b positioned equidistant between the ends of cam 26a; and Geneva driver 27 includes a like arcuate cam 27a and drive pin 27b. Driver 26 is mounted on a drive gear 28, and Geneva driver 27 is mounted on a further drive gear 29. Gears 28 and 29 mesh with one another whereby, upon rotation of said gears 28–29, the two Geneva drivers 26 and 27 rotate in opposite directions in synchronism with one another about axes of rotation defined by shafts 30 and 31. As will be apparent from the drawing, the axes of rotation of drivers 26 and 27 extend parallel to and are spaced from the axis of rotation of Geneva start 23, with the positions of the driver axes of rotation being concentric with the two opposed arcuate Geneva star camming surfaces 24 with which the drivers 26 and 27 are respectively associated.

Shafts 30 and 31 are mounted respectively in rotary thrust bearings 32 and 33 carried by a rocker arm 34 on opposite sides of a rocker arm shaft 35. Rocker arm 34 is adapted to describe an oscillatory motion about an axis defined by shaft 35; and as rocker arm 34 so oscillates the two shafts 30 and 31 reciprocate in opposing directions. This reciprocation causes relative axial movement between gears 28 and 29 during the counter rotation of said gears, and similarly causes reciprocating motion of the two drivers 26 and 27 concurrent with rotation of said drivers. In its uppermost position, each driver is moved into the same plane as that of Geneva star 23, as depicted in the drawing by driver 26; and in its lowermost position each driver is moved to a position where its cam and drive pin is axially spaced from the camming surfaces and drive slots of the Geneva star, as depicted in the drawing by driver 27. It will be appreciated that the relative positions of drivers 26 and 27 shown in the drawings represent an instantaneous position; and the two driver alternately reverse their relative positions during alternate time intervals as rocker arm 34 oscillates to reciprocate shafts 30 and 31.

The aforementioned rotary and reciprocating motion of drivers 26 and 27 is accomplished synchronously with rotation of projection shutter 13 and with the generation of the aforementioned pulse trains on lines 19 and 20. More particularly, input drive shaft 11 is coupled through a pair of helical gears 36 and a shaft 37 to an input drive idler gear 38 which meshes with gear 28. A flywheel 39 is provided on shaft 37 to smooth out motor loading due to cyclic torque variations. As shafts 30 and 31 reciprocate, the relative axial positions of gears 38, 28 and 29 change; but these three gears remain in constant mesh whereby 26 and 27 rotate in opposite directions at a constant rate determined by mo+or 10.

A further gear 40 carried by input drive shaft 11 meshes with an eccentric driver 41 having an off-center member 42 connected to one end of a spring link arm 43. Spring link arm 43 includes a block 44 in which a rod 45 is slidably mounted. The upper end of rod 45 defines a flange 46; and a precompressed sping 47 extends between flange 46 and a thrust washer 48 located above block 44. The lower end of rod 45 is mounted in a fitting 49 attached to member 42 of eccentric driver 41; and a further precompressed spring 50 extends between fitting 49 and a thrust washer similar to thrust washer 48 disposed adjacent the bottom of block 44.

By the arrangement described, it will be appreciated that, as eccentric driver 41 rotates, it tends to move fitting 49 and rod 45 in a reciprocating motion. In one direction of this reciprocation, forces are exerted on block 44 by means of precompressed spring 50, and in the opposite direction of the reciprocation forces are exerted on block 44 through precompressed spring 47. Block 44 is in turn connected to a yoke 51 which carries shaft 35 in a journal 52; and shaft 35, being connected to rocker arm 34, accordingly causes said rocker arm to exhibit an oscillatory motion with consequent reciprocation of Geneva drivers 26 and 27.

The resilient mechanism comprising spring link arm 43 is provided to permit the oscillatory motion of rocker arm 34 to be interrupted without otherwise affecting the drive to gears 28 and 29. More particularly, if rocker arm 34 should be prevented from oscillating, shaft 35, yoke 51, and block 44 will similarly be held in fixed position. Eccentric driver 41 may nevertheless continue to rotate; and as fitting 49 moves in an upward direction, spring 50 is further compressed while rod 45 and elements 46–48 merely move upwardly relative to stationary block 44. Similarly, as fitting 49 moves downwardly while block 44 is held in stationary position, spring 47 will be further compressed, and rod 45 and its associated spring 50 will merely move downwardly relative to fixed block 44. Thus, so long as rocker arm 34 is free to oscillate, the mechanism described operates to oscillate arm 34. However, the mechanism further permits the oscillatory motion of rocker arm 34 to be arrested without affecting any of the o+her portions of the system which are driven by motor 10 and shaft 11.

Means are provided for selectively arresting the oscillatory motion of rocker arm 34 and the reciprocating motion of drivers 26 and 27. The means provided for this purpose comprise a pair of solenoids 60 and 61 adapted to be selectively energized at terminals A and B respectively, and adapted, when energized, to move a slide 62 or 63 against the force of a solenoid return spring 64 or 65. The two slides 62 and 63 are disposed adjacent opposite ends of rocker arm 34; and the opposite rocker end arms are notched, as at 34a and 34b, to receive a slide 62 or 63 when the corresponding end of rocker arm 34 is in its uppermost position. When the slide 62 or 63 moves to a position below its corresponding rocker arm end, reciprocation of the Geneva drivers 26 and 27 is interrupted.

Considering now the operation of the described system, motor 10 drives shaft 11 to effect rotation of projection lamp shutter 13, generation of timing pulses on lines 19 and 20, and rotation of gears 38, 28, 29 to cause Geneva drivers 26 and 27 to counter-rotate in synchronism with one another. Assuming further that solenoids 60 and 61 are not energized, the oscillatory motion of rocker arm 34 is in no way impeded; and accordingly motor 10 operating through elements 40–42, spring link arm 43, yoke 51 and shaft 35 causes reciprocating motion of shafts 30 and 31 and of drivers 26 and 27 in synchronism with the rotation of said drivers 26 and 27. The reciprocating and rotary motion of each Geneva driver is phased in such a manner that the camming surfaces 26a and 27a of the two drivers 26 and 27 alternately engage opposite camming surfaces 24 on Geneva star 23. More particularly, the two drivers 26 and 27 are so positioned relative to one another and relative to star 23 that, when a driver is in its uppermost position (as in the case of driver 26), the cam of that driver is then in engagement with a camming surface of star 23. The angular position of the drive pin (such as 26b) of the Geneva driver is, at this time, spaced from the drive slot 25 of the Geneva star 23. The angular position of the drive pin on the other driver, however, is such that drive could be effected to star 23; but said other driver (as illustrated by driver 27) is at this time moved to an axial position such that its pin cannot drive the star 23.

As the driver having its cam in engagement with a related camming surface of star 23 continues to rotate, and as its drive pin moves angularly toward a position where drive could be effected, that driver is concurrently reciprocated to a position such that drive cannot be achieved; and the other driver is concurrently moved to a position where its cam can engage an associated camming surface 24 of star 23. Thus, during alternate time intervals, the arcuate cam of each driver engages a camming surface of the Geneva star, with each such driver thereafter moving axially to a position wherein its drive pin is axially spaced from the drive slots 25 of star 23.

When a cam such as 26a or 27a is in engagement with its associated camming surface 24, the star 23 is locked in a detent position. Actually, since the two cams 26a and 27a extend over 270°, there is a slight overlap where both drivers are simultaneously in engagement with the star to keep the star locked in position. In general, as long as the drive operates in the mode discussed above, i.e., with drivers 26 and 27 rotating and rocker arm 34 reciprocating in phase, Geneva star 23 and its output shaft 21 will remain indexed in one of four possible detent positions; and no film transport will take place.

In order to index star 23 and shaft 21, the reciprocating motion of drivers 26 and 27 is selectively interrupted by momentarily energizing one or the other of solenoids 60 and 61. The actual direction in which indexing occurs is determined by which of the two solenoids is energized. Energization of solenoid 60 or 61 is effected by applying a pulse to terminal A or B. This energization pulse is actually derived from the pulse trains 19 and 20, the pulses of which correspond in timing and repetition rate to the mechanical positions and reciprocating motion of the Geneva drivers; and each pulse in the train has a pulse length which is approximately equal to the period for one cycle of the Geneva drivers. Accordingly the pulse length and resulting hold in time of the energized solenoid 60 or 61 is substantially equal to the period for one cycle of the Geneva driver.

When a pulse is applied to solenoid 60 or 61, the solenoid is energized and its corresponding slide 62 or 63 is moved to a position underneath the corresponding end of rocker arm 34. The slide can actually pass beneath the rocker arm only when rocker arm 34 is at its maximum travel position since less than 0.005 inch clearance is provided between the two members. In practice, the solenoid timing is set to prematurely energize the solenoid in question, causing its associated slide to contact the side of rocker arm 34 where it remains until the rocker arm reaches its maximum position. The slide then moves into place underneath the corresponding end of rocker arm 34 to prevent further oscillatory motion of the rocker arm. Since the selected solenoid is energized by a single pulse having a length corresponding to the rotational period of the drives, the solenoid in question will de-energize upon termination of the pulse, and its slide 62 or 63 is automatically withdrawn at the completion of one driver cycle by solenoid return spring 64 or 65. Actually, the solenoid timing need not be precise since friction between rocker arm 34 and slide 62 or 63 will hold the slide in position until the cycle is complete and the rocker arm is once again in phase with eccentric driver 41 and at its maximum position.

When reciprocation of the drivers 26 and 27 is interrupted, the driver which then has its cam in engagement with a camming surface of star 23 is prevented from moving axially. That driver accordingly continues to rotate in the same plane as that of star 23; and its drive pin will engage a drive slot 25 of star 23 to index the star one position (90°). The direction of rotation of the star is determined by which solenoid is energized, i.e., which driver 26 or 27 is permitted to effect drive to the star 23. Since the two drivers 26 and 27 rotate in opposite direction, drive pin 26b of driver 26 will index star 23 in a counter-clockwise direction (as viewed in the drawing) whereas drive pin 27b of driver 27 will index star 23 in a clockwise direction. This indexing operation occurs only during the time that solenoid 60 or 61 is energized, corresponding to a single cycle of the drivers 26 or 27; and by controlling the energization of the two solenoids 60 and 61, the actual indexing speed can be readily controlled.

The energization of solenoid 60 and 61 is controlled by a switching and logic arrangement shown at the bottom of the drawing. Line 19 is coupled to a terminal F to provide pulses for use in "forward" indexing operations, and line 20 is coupled to a terminal R for producing time-displaced pulses for use in "reverse" indexing operations. A central terminal S (or "stop") is provided to which no pulses are applied. A switch comprising ganged switch blades 65–66 is movable between related pairs of terminals F–F', S–S', and R–R'. When switch blade 65 is in contact with terminal F or R, a train of pulses having a repetition rate of 30 pulses per second is coupled via line 67 to a logic circuit 68 comprising a plurality of pulse dividers. Logic circuit 68 has a plurality of outputs, i.e., output 69 furnishing signals at a repetition rate of 30 pulses per second; output 70 furnishing signals at 15 pulses per second; output 71 furnishing pulses at 7.5 pulses per second; output 72 providing an output of substantially 1 pulse per second (actually $15/16$ pulse per second); and an output 73 capable of providing a single stepping pulse at will, synchronized in time with the basic 30 p.p.s. frequency. The various outputs 69–73 are coupled to push button switches 69a–73a whereby any selected pulse or sequence of pulses can be coupled to switch blade 66. The actual pulses selected operate to energize either solenoid 60 or solenoid 61 depending upon whether ganged switch 65–66 is in its F–F' or R–R' position.

By way of example, if switch 65–66 is in its F–F' position, and if push button 73a is depressed, solenoid 60 will be energized once to index star 23 in a forward direction once, whereafter the system will rest until button 73a is again depressed. If switch 65–66 is in its R–R' position, depression of button 73a will similarly energize solenoid 61 and cause a single indexing operation in a reverse direction. If switch 65–66 is in its F–F' position, depression of button 72a will cause a forwarding index operation to occur automatically at substantially one frame per second; depression of button 71a will cause a forward indexing operation to occur automatically at a rate of substantially 7.5 frames per second; depression of button 70a will cause a forward indexing operation at a rate of 15 frames per second; and depression of button 69a will cause a forward indexing operation at the rate of 30 frames per second. Similar variable indexing rates can be achieved in a reverse direction by movement of switch 65–66 into its R–R' position, accompanied by depression of the appropriate indexing rate button 69a–73a.

While we have thus described a preferred embodiment of the present invention, many variations will be suggested to those skilled in the art. It must therefore be emphasized that the foregoing description is intended to be illustrative only, and not limitative of our invention; and all such variations and modifications as are in accord with the principles described are meant to fall within the scope of the appended claims.

Having thus described our invention, we claim:

1. An intermittent drive mechanism comprising a Geneva star mounted for rotation about an axis, said star including plural, arcuate camming surfaces having drive slots disposed therebetween, a pair of Geneva drivers positioned adjacent said star, each of said drivers including an arcuate cam and a drive pin spaced from said cam, each of said drivers being mounted for rotation about an axis parallel to that of said star and each of said drivers being further mounted for reciprocation along its axis of rotation, means for rotating said drivers synchronously in opposing directions, means for reciprocating said drivers along their axes of rotation in synchronism with the rotation of said drivers, the positioning, rotation, and reciprocation of said drivers relative to said star being such that, during alternate time intervals, the arcuate cam of each driver engages a camming surface of said star with each such driver thereafter moving axially to a position wherein its drive pin is axially spaced from the drive slots of said star, and means for selectively interrupting the reciprocating motion of said drivers without interrupting their rotation whereby the drive pin of the driver whose cam is then in engagement with a star camming surface effects drive to said star during a next subsequent time interval.

2. The drive mechanism of claim 1 wherein said drivers are positioned respectively adjacent opposed camming surfaces of said star, said drivers being mounted respectively on separate shafts, said means for rotating said drivers including gear means interconnecting said driver shafts, and said means for reciprocating said drivers including a rocker arm extending between and connected to said driver shafts, said rocker arm being mounted for oscillatory motion about an axis located between said driver shafts.

3. The drive mechanism of claim 2 including a drive motor coupled to said gear means and to said rocker arm, the coupling between said drive motor and rocker arm including a resilient coupling element.

4. The drive mechanism of claim 2 wherein said means for selectively interrupting the reciprocating motion of said drivers includes electrically energizable solenoid means for selectively preventing said oscillatory motion of said rocker arm.

5. The drive mechanism of claim 4 wherein said solenoid means comprises a pair of solenoids positioned respectively on opposite sides of said rocker arm axis, and means for energizing a selected one of said solenoids to render a selected one of said drivers operative to drive said star in a selected one of two opposite directions.

6. The drive mechanism of claim 5 wherein said energizing means includes electrical pulse generating means for generating a train of pulses having a timing and repetition rate related to the rates of rotation and reciprocation of said drivers, and means responsive to selected pulses in said train for controlling the time and duration of energization of said solenoids.

7. The drive mechanism of claim 1 including means for generating electrical signals at a rate related to the rates of rotation and reciprocation of said drivers, said means for selectively interrupting the reciprocating motion of said drivers including electrical means responsive to said signals.

8. The drive mechanism of claim 7 wherein said signal generator includes a light source, a light sensitive element spaced from said source, a shutter positioned between said source and said element, and means for driving said shutter at a rate related to the speed of rotation of said drivers.

9. The drive mechanism of claim 1 having an output shaft driven by said star for transporting a strip of film in a film viewer, said viewer including a light shutter driven at a rate related to the rate of rotation of said drivers.

10. The drive mechanism of claim 9 including a common drive motor for driving said shutter, and for rotating and reciprocating said drivers, in synchronism with one another.

References Cited

UNITED STATES PATENTS

| 1,166,120 | 12/1915 | Fox | 74—436 |
| 2,173,230 | 9/1939 | Kellogg | 352—189 |

FOREIGN PATENTS

| 225,999 | 4/1969 | Sweden | 352—180 |

S. CLEMENT SWISHER, Primary Examiner

U.S. Cl. X.R.

74—436; 352—189